United States Patent [19]
Spivey, Jr.

[11] 4,341,073
[45] Jul. 27, 1982

[54] CONTROL CIRCUIT FOR VARIABLE DISPLACEMENT PUMPS WITH OVERRIDE VALVE

[75] Inventor: William J. Spivey, Jr., Joliet, Ill.
[73] Assignee: Caterpillar Tractor Co., Peoria, Ill.
[21] Appl. No.: 89,126
[22] PCT Filed: Jun. 13, 1979
[86] PCT No.: PCT/US79/00413
§ 371 Date: Jun. 13, 1979
§ 102(e) Date: Jun. 13, 1979
[51] Int. Cl.³ .................. F04B 49/00; F16H 39/46
[52] U.S. Cl. ........................................ 60/399; 60/436; 60/447; 60/488; 417/218
[58] Field of Search .............. 60/399, 403, 423, 431, 60/433, 447, 487, 488, 444, 436; 417/218; 251/209

[56] References Cited
U.S. PATENT DOCUMENTS

| 2,510,514 | 6/1950 | Mueller | 251/209 |
|---|---|---|---|
| 2,774,434 | 12/1956 | Ferris . | |
| 3,247,669 | 4/1966 | Hann . | |
| 3,434,427 | 3/1969 | Smith et al. . | |
| 3,451,218 | 6/1969 | Grant | 60/444 X |
| 3,627,070 | 12/1971 | Colten . | |
| 3,805,676 | 4/1974 | Hamma et al. | 91/506 |
| 3,807,174 | 4/1974 | Wagenseil | 60/420 |
| 3,855,792 | 12/1974 | Bojas et al. | 60/421 |
| 3,898,807 | 8/1975 | Habiger | 60/391 |
| 3,952,514 | 4/1976 | Habiger | 60/445 |
| 3,990,320 | 11/1976 | Habiger | 74/473 R |
| 3,996,743 | 12/1976 | Habiger et al. | 60/431 |
| 4,041,702 | 8/1977 | Habiger | 60/431 |
| 4,106,292 | 8/1978 | Habiger | 60/447 |
| 4,211,079 | 7/1980 | Saele | 60/444 |

Primary Examiner—Irwin C. Cohen
Attorney, Agent, or Firm—Phillips, Moore, Weissenberger, Lempio & Majestic

[57] ABSTRACT

A fluid control cirucit for selectively varying the displacement of a variable displacement pump (P), such as the type employed in a hydrostatic transmission, comprises a primary control circuit connecting a pressurized fluid source (10) with the pump (P) and adapted to be actuated to selectively vary the displacement of the pump (P) between minimum and maximum values. A separate override control circuit is connected to the primary control circuit to override it to selectively vary the displacement of the pump (P).

16 Claims, 7 Drawing Figures

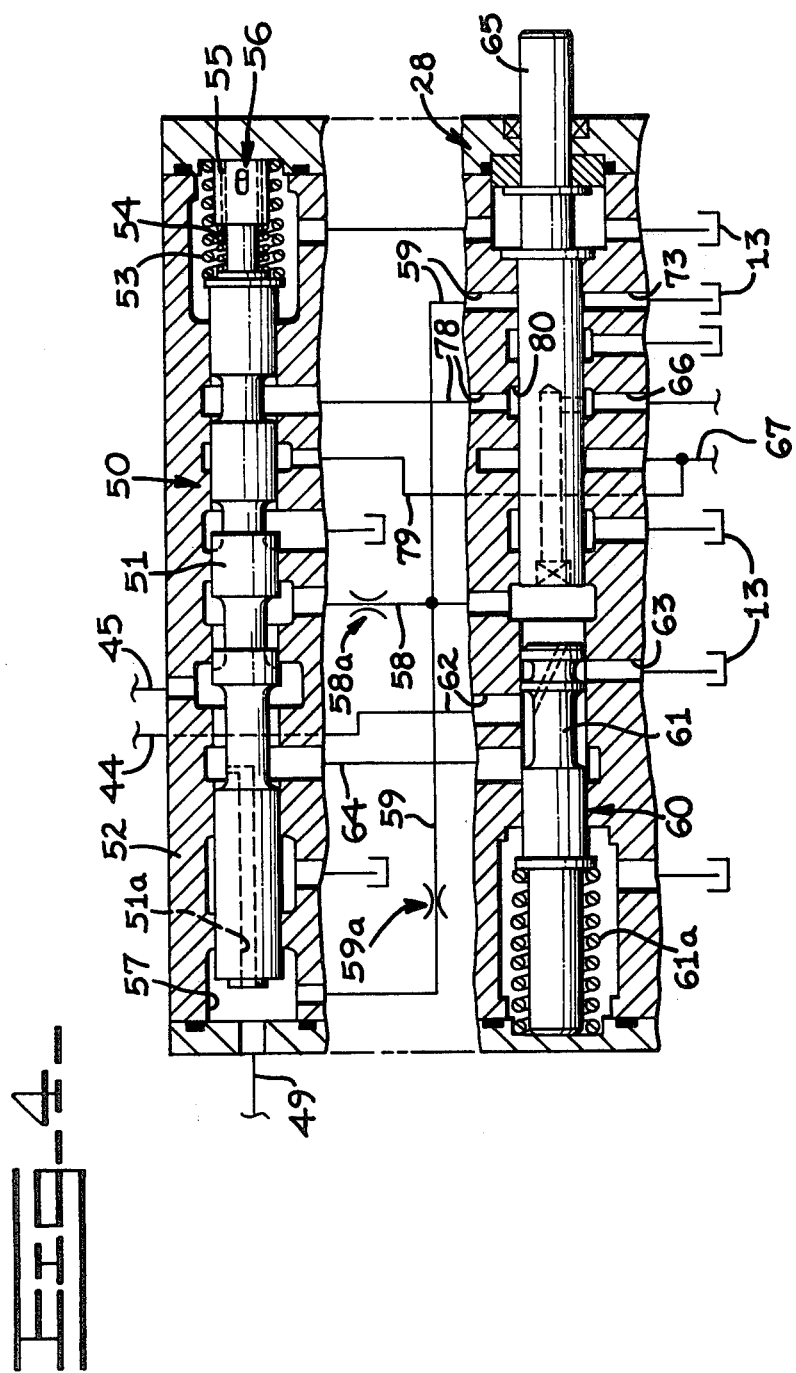

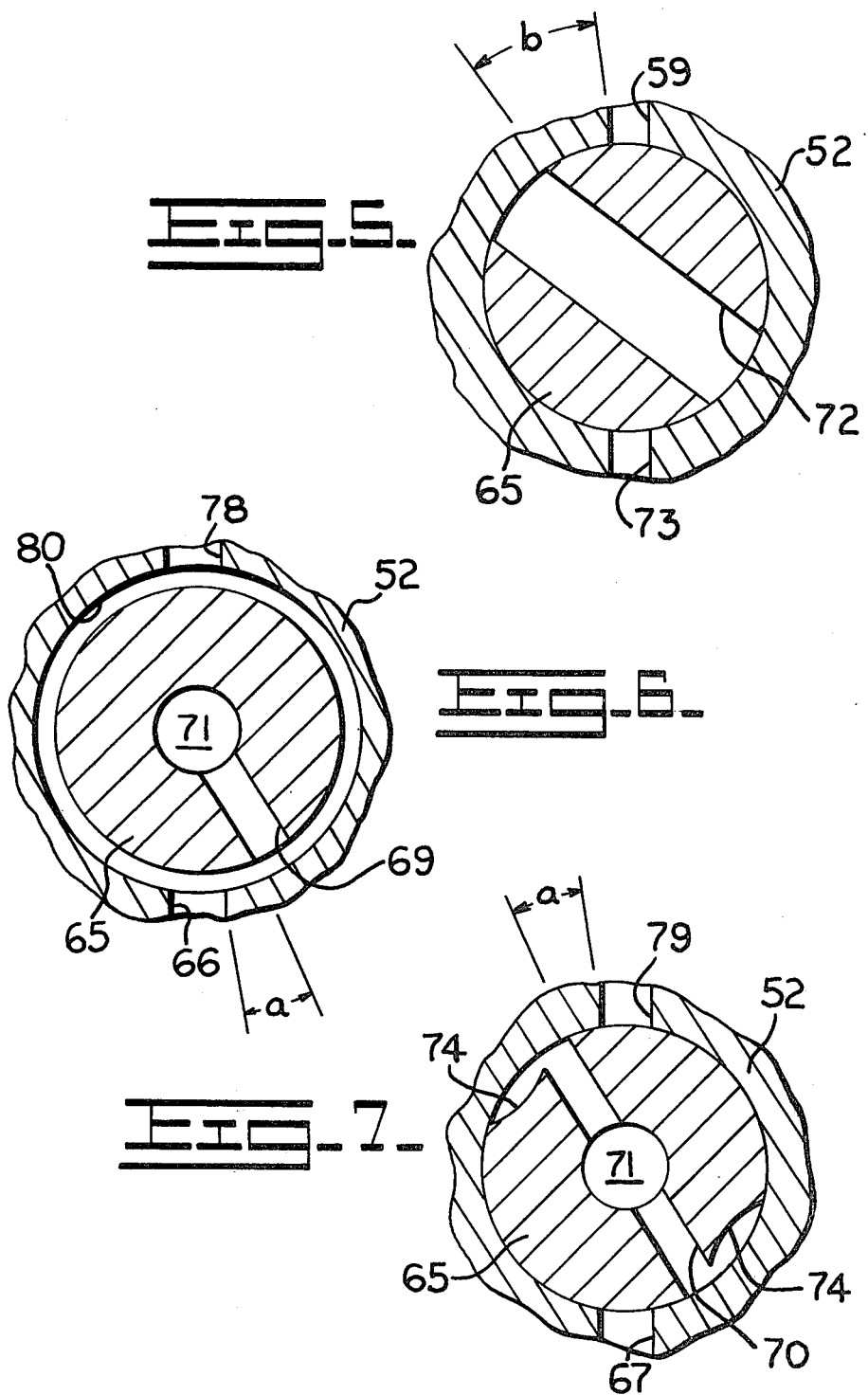

CONTROL CIRCUIT FOR VARIABLE DISPLACEMENT PUMPS WITH OVERRIDE VALVE

TECHNICAL FIELD

This invention relates to a control circuit for selectively varying the displacement of a pump, the circuit including primary control means and override control means for overriding the primary control means independent of actuation thereof.

BACKGROUND ART

Variable displacement pumps, such as those employed in hydrostatic transmissions, are adapted to have the displacements thereof varied between minimum and maximum levels upon adjustment of servo-systems connected to the pumps which are adapted to actuate swash plates of the pumps in a conventional manner. U.S. Pat. No. 3,996,743, assigned to the assignee of this application and issued to Cyril W. Habiger on Dec. 14, 1976, discloses a conventional control circuit for controlling the displacement of pumps of this type.

The control circuit comprises an underspeed actuator which is connected to the servo-systems and further connected to a venturi to receive a differential fluid pressure signal therefrom which is proportional to the speed of a vehicle's engine to automatically control the underspeed actuator for automatically varying the displacement of the pumps under certain conditions of engine operation. The control circuit further comprises a directional control valve movable to a vent and override position to equalize the differential fluid pressure signal whereby the automatic operation of the underspeed actuator may be overriden.

When the control valve is in this position, pressurized fluid is blocked from communicating with replenishing and relief valves of the pump system and also to normally "on" brakes of the vehicle which must be released by fluid pressure. When the control valve is moved from its vent towards its maximum speed position, pressurized fluid is communicated to the brakes to release them and also to the replenishing and relief valves of the pump system to condition the pumps for operation. Simultaneously therewith, the above-mentioned differential fluid pressure signal is re-established to permit the underspeed actuator to control displacement of the pumps automatically, should the need arise.

It has proven desirable, particularly in the application of the control circuit of the present invention to hydrostatic transmissions, to construct and arrange an override control valve as a separate unit from a main control valve which controls the venting and primary control functions of the circuit. In addition to rendering the circuit efficient for expeditious and close control by the operator, the respective control valves and associated components of the control circuit may be arranged for efficient servicing. Also, the main control valve can be maintained operational in its "run" position upon movement of the override control valve from its closed position to its open, override position and back to its closed position.

DISCLOSURE OF INVENTION

The present invention is directed to overcoming one or more of the problems as set forth above.

In one aspect of the invention, the control circuit comprises a source of pressurized fluid, a variable displacement pump means for having the displacement thereof varied in response to communication of pressurized fluid thereto, primary control means connecting the source with the pump means for selectively venting pressurized fluid from the pump means or for varying the displacement of the pump means between minimum and maximum values, and override control means for overriding the same when the primary control means is in its actuated condition of operation for selectively varying the displacement of the pump means, independent of actuation of the primary control means.

In another aspect of this invention, the override control means preferably comprises a rotatable valve spool for closely controlling a fluid pressure signal normally utilized to automatically control the displacement of the pump means. In addition to providing close control of the override function, the valve is adapted to provide a much more compact package in comparison with valves adapted for linear movement.

In still another aspect of this invention, the primary control means includes a pair of associated first and second valve means which form a fluid-actuated reset means for assuring that the variable displacement pump means will not be initially actuated with the control circuit maintained in a "run" condition of operation.

The control circuit of this invention thus separates the above primary control and override functions to render the systems highly efficient for operator operation and adapts it for expeditious servicing.

BRIEF DESCRIPTION OF DRAWINGS

FIGS. 3 and 4 are sectional views illustrating the reset valve in progressively actuated conditions of operation; and FIGS. 5–7 are enlarged sectional views taken through the override valve, in the direction of arrows V—V, VI—VI, and VII—VII, respectively, in FIG. 2.

BEST MODE OF CARRYING OUT THE INVENTION

General Description

Figure 1:
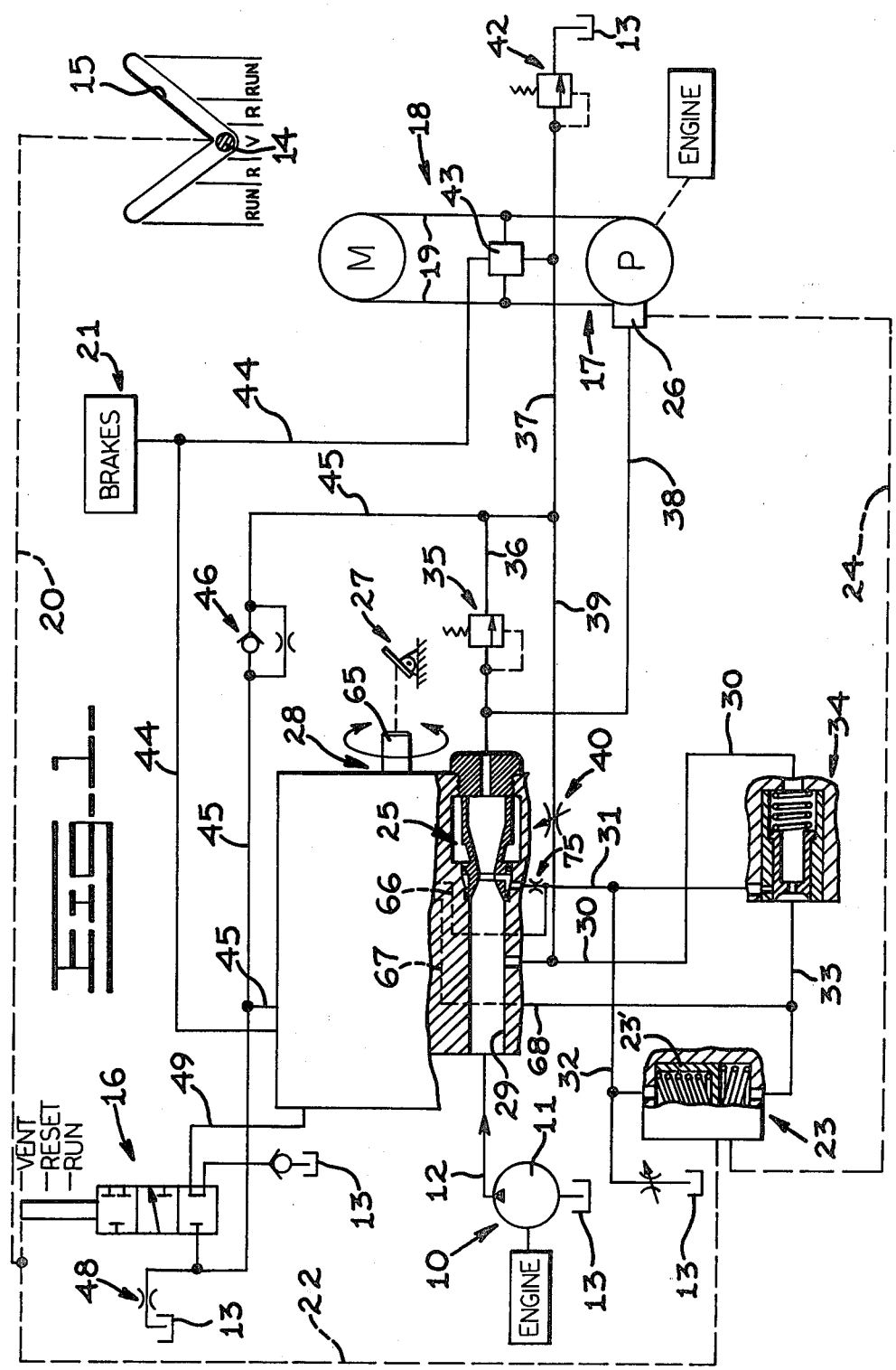
FIG. 1 schematically illustrates a control circuit embodiment of the present invention with portions thereof broken-away for clarification purposes.

FIG. 1 illustrates a control circuit embodiment of this invention comprising a source of pressurized fluid 10, preferably comprising an engine-driven positive displacement pump 11 adapted to charge an inlet line 12 of the circuit with pressurized fluid (hydraulic) from a common reservoir or tank 13. As described more fully hereinafter, a primary control means includes a control lever 14 adapted to be moved in a V-shaped slot 15 by an operator to move a three-position directional control valve 16 in a "vent", "reset" or "run" position of operation for selectively controlling the operation and displacement of an engine-driven variable displacement pump P of a pump means 17. In the illustrated embodiment, the pump means (further comprising hereinafter described servo system 26 and a replenishing valve 43) is suitably connected to a fluid motor M of a hydrostatic transmission 18. The transmission package further includes a closed loop 19 interconnected between pump P and motor M in a conventional manner, as more fully described in above-referenced U.S. Pat. No. 3,996,743.

In general, when directional control valve 16 is moved to its "run" position by control lever 14 (either forward or reverse) by means of a schematically illustrated linkage 20, normally "on" brakes 21 of a vehicle will be released and the control circuit will be conditioned to supply pressurized fluid to pump means 17 from engine-driven pump 11. As further described in the above-referenced patent, speed control lever 14 is further mechanically connected, as schematically illustrated at 22, to a standard underspeed actuator or control means 23 to manually adjust the position of the illustrated piston 23' thereof. The selected position of piston 23' will, in turn, determine the displacement of pump P, via a linkage 24 interconnected between a servo system 26 and underspeed actuator 23, between minimum ("full underspeed") and maximum ("zero underspeed") values. The position of piston 23' of the underspeed actuator and thus the displacement of pump P is further responsive to a fluid pressure differential or signal created across a venturi 25 and communicated to either end of piston 23', such pressure differential being proportional to the speed of pump 11 and the engine.

Should the operator desire to override the above, briefly described fluid pressure signal he need only to depress a pedal 27 of an override and control means which comprises a rotary override valve 28. In essence, rotary movement of override valve 28 to an open position will function to vary the fluid pressure signal in a closely controlled manner to selectively reposition piston 23' in underspeed actuator 23 whereby the displacement of pump P can be changed for certain operating conditions of the vehicle. Return of the override valve to its normally closed position will not affect the prior setting of speed control lever 14 and associated directional control valve 16 and permits the underspeed actuator to reassume normal operation.

DETAILED DESCRIPTION

Communication of pressurized fluid to an inlet 29 of venturi 25 from pump 11 will create a pressure differential or signal between a line 30 connected to inlet 29 and a line 31 connected to the throat portion of the venturi. This differential pressure will be communicated to either end of piston 23' of underspeed actuator 23, via lines 32 and 33, the latter line being connected to line 30 through a quick response or shunt valve 34. The underspeed actuator will function in a conventional manner during normal operation to regulate servo system 26 of pump means 17 for controlling the displacement of pump P. Shunt valve 34 essentially functions to interconnect lines 30 and 33 for fluid flow therebetween and is adapted to open to communicate line 33 with lines 31 and 32 when piston 23' of underspeed actuator 23 moves downwardly quickly to create a pressure surge in line 33. Shunt valve 34, although desirable, could be eliminated from the control circuit which would remain fully operational.

A pressure regulating valve 35 is connected in a line 36, connected to a downstream side of venturi 25, to supply pressurized fluid at a predetermined level to hydrostatic transmission 18, via a line 37. A line 38 is interconnected between line 36 and servo system 26 to comunicate pressurized fluid at a predetermined level to the servo system in a conventional manner.

If so desired, a bypass arrangement, comprising a line 39 and an adjustable orifice 40 connected therein, may be interconnected between lines 30 and 37. This bypass arrangement across venturi 25 may be utilized to closely control and finely "tune" the differential pressure drop across the venturi and the fluid pressure signal communicated to underspeed actuator 23 to compensate for manufacturing variances and the like in the venturi, pumps, etc. This bypass arrangement, although desirable, could be eliminated from the control circuit which would remain fully operational.

A pressure relief valve 42 is connected in line 37 to assure that a replenishing valve 43 of pump means 17 is conventionally charged with a predetermined level of pressurized fluid. In addition to supplying fluid pressure to the hydrostatic loop 19 of transmission 18, valve 43 further communicates with a line 44 which connects with actuating chambers (not shown) of brakes 21 of the vehicle. In the "vent" position of directional control valve 16 in FIG. 1, line 44 will be vented to tank 13, as more fully described hereinafter, whereby brakes will remain in their "on" condition of operation.

Line 36 is further connected to a line 45, having a check valve 46 connected therein with line 45 being further connected to directional control valve 16. Line 45 also connects with tank 13 via a restricted orifice 48 which is primarily utilized to compensate for any leakage occurring in valve 16. A line 49 is utilized for resetting the control circuit to prevent energization of transmission 18 when directional control valve 16 is maintained in its "run" position upon starting of the engine.

Figure 2:
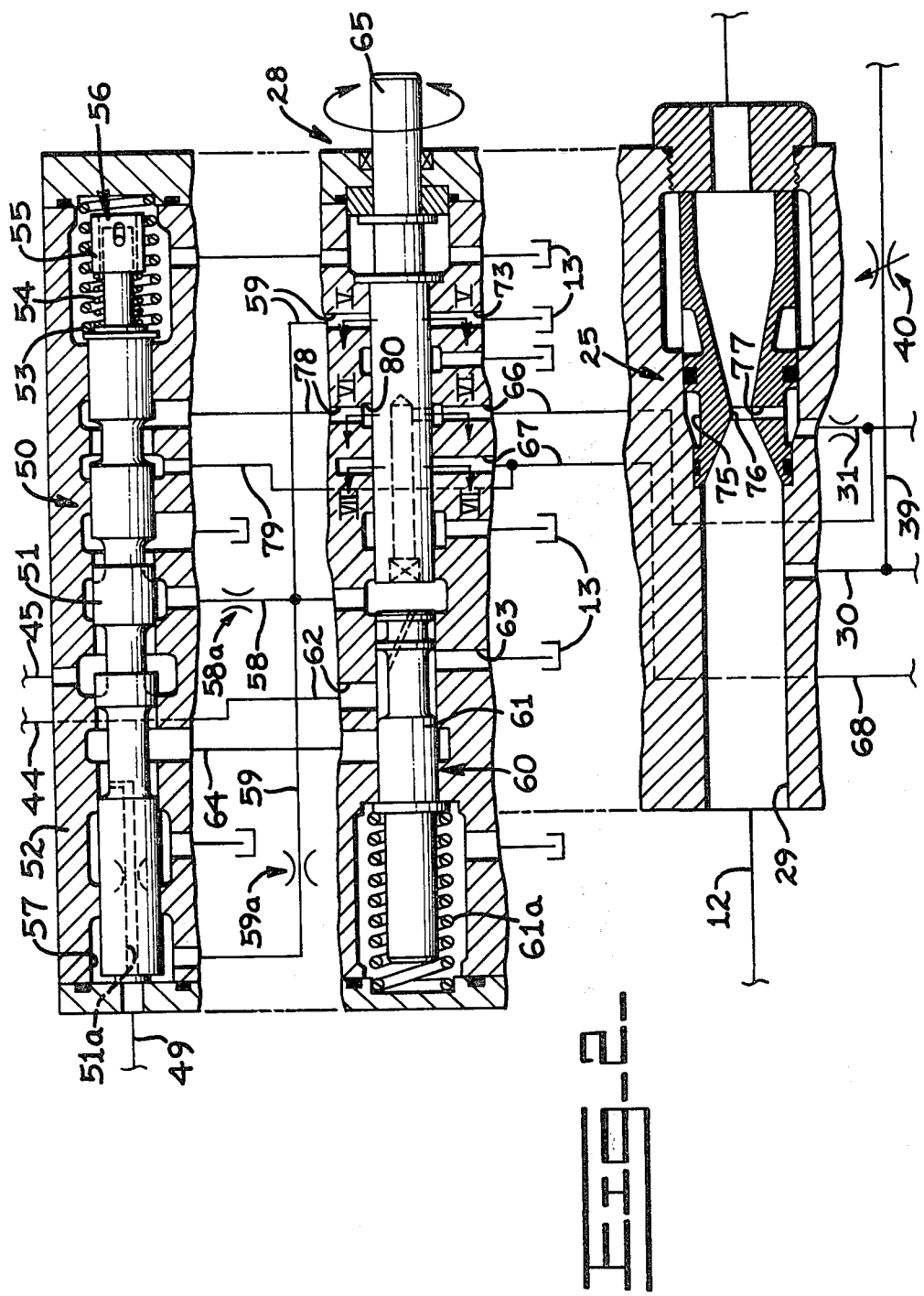
FIG. 2 is a sectional view illustrating an override control valve associated with a reset valve and venturi employed in the control circuit.

In particular, FIG. 2 illustrates a first valve means 50 of a reset means which must be moved to its FIG. 4 reset position before pump means 17 can be actuated to drive motor M. As more fully described hereinafter, any attempt by the operator to start the vehicle when directional control valve 16 is in its "run" condition of operation would be to no avail since replenishing valve 43 of transmission 18 (FIG. 1) will remain connected to tank 13. In addition, brakes 21 will remain in their "on" condition of operation to prevent the vehicle from being moved, as also described hereinafter.

Figure 3:
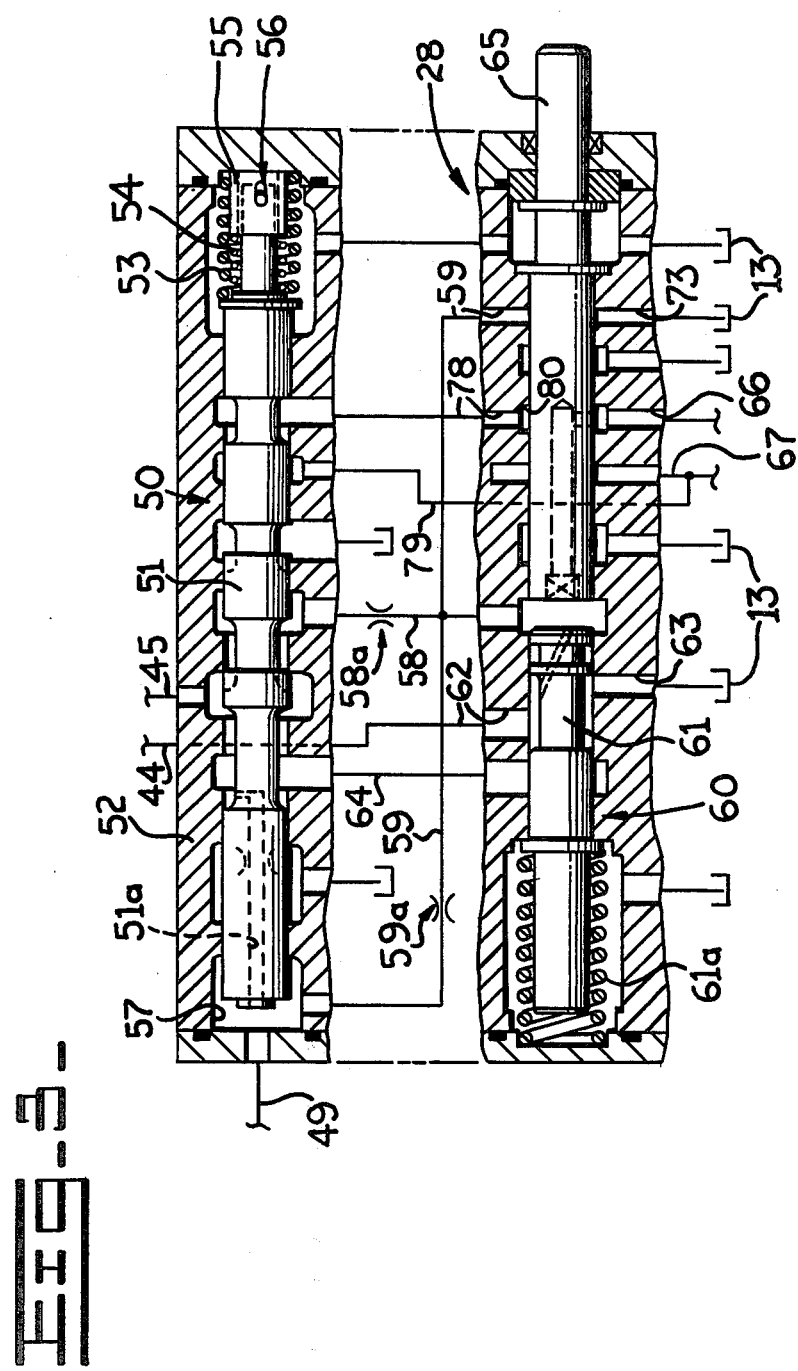

Valve means 50 comprises a spool 51 having a restricted passage 51a formed therein, suitably mounted for reciprocal movement in a housing 52 of the transmission control group and is spring biased leftwardly to its first or closed position in FIG. 2 by a first coil spring 53. A less stiff second coil spring 54 is mounted between the spool and a tubular sleeve 55, mounted on the end of the spool by a pin and slot connection 56. Pressurization of line 49 to move spool 51 rightwardly towards a second, open position will thus initially compress spring 53 to engage the right end of sleeve 55 with housing 52 (FIG. 3) whereafter spring 54 will compress along with further compression of spring 53 to subsequently engage the right end of spool 51 with the housing (FIG. 4). This "delayed action" of first valve means 50 assures conditioning of the control circuit for operation, including the desired operation of the reset means, as described more fully hereinafter. As shown in FIGS. 3 and 4, once reset valve 50 has been opened by pressurizing an actuating chamber 57 via line 49, pressurized fluid in line 45 will be communicated to the chamber via internal passages 58 and 59 and restricted passage 51a to maintain the spool in its second, open position. It should be noted that passages 58 and 59 preferably have restrictions 58a and 59a therein, respectively.

FIG. 2 further illustrates a second valve means 60 of the reset means comprising a spool 61 biased rightwardly to its first, open position to normally vent line 44 to tank 13, via interconnected internal passages 62 and 63 when control valve 16 is maintained in its FIG. 1

"vent" position. Referring to FIG. 3, when pressurized fluid is communicated to the right end of spool 61 via line 45 and passage 58, the spool will move leftwardly to a second, closed position to block communication between passages 62 and 63 and to open communication between lines 44 and 45 via internal passages 62 and 64.

As more fully described hereinafter, spool 61 is maintained in this closed position when spool 51 moves further rightwardly to its FIG. 4 position by communication of pressurized fluid to the rightward end thereof from chamber 57, via passages 59 and 58. Thus, from the above description it can be seen that when directional control valve 16 (FIG. 1) is maintained in its "reset" or "run" position, normally "on" brakes 21 will be released. Furthermore, replenishing valve 43 of transmission 18 is simultaneously placed in communication with pressurized line 45, via line 44.

As further shown in FIG. 2, override valve 28 comprises a spool 65 rotatably mounted in housing 52 to normally block communication between a pair of passages 66 and 67, the latter passage communicating with a line 68. Passages 66 and 67 are adapted to intercommunicate when the spool is rotated to an open position to change the differential fluid pressure prevalent as between lines 30 and 31 to override the operation of the primary control means comprising speed control lever 14, directional control valve 16 (FIG. 1) and underspeed actuator 23. As shown in FIGS. 6 and 7, rotation of spool 65 in a clockwise direction past an angle "a" relative to housing 52 will initially communicate passages 66 and 67, via radial passages 69 and 70 and a longitudinal passage 71 formed in the spool. Further clockwise rotation of the spool past angle "b" in FIG. 5 will function to vent actuating chamber 57 to tank 13, via passage 59, a radial passage 72 formed through the spool and a passage 73.

As described more fully hereafter, directional control valve 16 (FIG. 1) must be first repositioned to its "reset" position and then to its "run" position before the control circuit can be reconditioned for control of the displacement of pump means 17. However, so long as the spool is not rotated to the extent of angle "b" (FIG. 5), the spool can be returned to its closed position to reinstate the normal operation of the control circuit (with directional control valve 16 remaining in its "run" position). It should be further noted that a pair of metering slots 74 (FIG. 7) are formed in spool 65 at the ends of passage 70 to closely control the desired change in the fluid pressure signal which automatically controls the operation of underspeed actuator 23.

During the override condition of operation and referring to FIG. 2, the controlled interchange of fluid between passages 66 and 67 will thus effect the differential pressure or signal occasioned across venturi 25 since passage 66 communicates with line 31. Passage 66 is connected to line 31 on a downstream side of a fixed orifice 75 which communicates with a throat 76 of venturi 25 via a radical port 77. It should be noted that passage 67 further communicates with line 68 which is, in turn, connected to line 33 of the underspeed control arrangement, including underspeed valve 23 and quick response valve 34.

It should be further noted in FIG. 2 that when spool 51 of the reset means is in its closed position that passages 66 and 67 are interconnected via passages 78 and 79 and an annulus 80. Thus, an equal pressure is communicated to either side of underspeed actuator 23 via lines 32 and 33 (FIG. 1) to move spool 23' to a zero speed condition of operation. When spool 51 is moved to its FIG. 4, open position, communication between passages 78 and 79 is blocked and passages 66 and 67 can only communicate with each other upon rotation of spool 65 to override control valve 28 to override the fluid pressure signal communicated to underspeed actuator during normal operation. Since the underspeed actuator is connected to servo system 26 of pump means 17 by linkage 24 (FIG. 1), it is desirable to always make certain that the linkage on the actuator is at a zero input condition whenever the vehicle is at rest or the control circuit is being overridden in the above-described manner by override control valve 28. Such zero input condition relates to the input to servo system 26.

INDUSTRIAL APPLICABILITY

As indicated above, the fluid control circuit of this invention finds particular application to hydrostatic transmission 18 (FIG. 1) which may be employed in a construction vehicle such as a track-type tractor. Although the transmission is shown with a single pump and a single motor, it should be understood that normally a pair of each are employed in the vehicle.

Assuming that the engine of the vehicle is running to drive pump 11 and that speed control lever 14 is in its "vent" or "V" position illustrated in FIG. 1, pump pressure, as established by relief valve 35 and the pressure drop across venturi 25, will be communicated to inlet 29 of venturi 25 to charge the control circuit with pressurized fluid. During this condition of operation, vehicle brakes 21 are held in an "on" condition of operation since line 44 communicates with tank 13 through valve means 60 via passages 63 and 63 (FIG. 2). As suggested above, brakes 21 may be of conventional design wherein springs (not shown) normally hold the brakes in their "on" condition of operation and the brakes are released by communicating pressurized fluid to actuating chambers thereof.

Line 44, common to brakes 21 and replenishing valve 43, will simultaneously communicate the valve with tank 13. The parallel lines comprising loop 19 of transmission 18 are thus interconnected or "shunted" whereby the transmission is rendered non-operational in a conventional manner.

Also, during the "vent" condition of operation, it is assumed that foot pedal 27 has not been depressed to thereby maintain override valve 28 in its inactivated or closed condition of operation with passages 66 and 67 being maintained out of communication, as shown in FIGS. 6 and 7. The pressure differential or signal thus occasioned as between lines 30 and 31 will be communicated to either side of underspeed actuator 23 to ready the control circuit for normal operation. Pressure regulating valve 35 will maintain a predetermined back pressure on the downstream side of venturi 25 (e.g., 350 psi) whereas pressure relief valve 42 will function to charge line 37 and replenishing valve 43 with fluid maintained at a predetermined pressure (e.g., 150 psi). It should be further noted in FIG. 2 that spool 51 of valve means 50 is positioned to block line 45 and that directional control valve 16 is in its "vent" position (FIG. 1) to block communication between lines 45 and 49, the latter line leading to actuating chamber 57 of the reset means comprising valve means 50 and 60.

When the operator now shifts speed control lever to one of the two "reset" or "R" positions in notch 15 (FIG. 1), directional control valve 16 will responsively move downwardly one position to communicate pressurized fluid from line 45 to line 49 to charge actuating chamber 57 (FIG. 3) with pressurized fluid to initiate rightward movement of spool 51.

As shown in FIG. 3, initial movement of spool 51 rightwardly will communicate line 45 with chamber 57, via restricted passage 51a. Thus, once such communication is established, spool 51 will continue to move rightwardly even though the operator should quickly shift lever 14 and control valve 16 into their "run" positions. It should be noted that pressurized fluid in line 45 is further communicated to chamber 57, via passages 58 and 59.

As discussed above, rightward movement of spool 51 is in two stages in that the spool will initially compress spring 53 to engage the rightward end of sleeve 55 with housing 52 (FIG. 3) and will thereafter compress both springs 53 and 54. Spring 53 may be calibrated to permit spool 51 to move rightwardly to its FIG. 3 position when the pressure level in the chamber reaches 20 psi, for example. Full opening of spool 51 to its FIG. 4 position may require a pressure level at least 115 psi in chamber 57, for example.

The above sequence and delayed opening of valve means 50 will insure full actuation and closing of valve means 60. In particular, when spool 51 has moved to its intermediate "reset" position illustrated in FIG. 3, pressurized fluid will be communicated to the right end of valve spool 61, via lines 45 and 58. Spool 61 will thus begin to move leftwardly against the counteracting force of a spring 61a when the fluid pressure at the right end of spool 61 reaches 115 psi.

Upon full movement of spool 51 to its FIG. 4 position, the spool will permit limited communication of line 45 with passage 58 and the rightward end of spool 61. Chamber 57 is also maintained in communication with passage 58, via restricted passage 59, to communicate sufficient fluid pressure (e.g. 115 psi) to the rightward end of spool 61 to maintain it in its FIG. 4, closed position. Simultaneously therewith, spool 61 will block communication between passage 62 and drain passage 63.

Pressurized fluid now freely communicates from line 45 to line 44, through valve means 50 and 60, to release brakes 21 and to permit charging of replenishing valve 43 (FIG. 1). The operator may now shift speed control lever 14 to a "run" position (reverse or forward), along with slaved directional control valve 16, whereby lines 45 and 49 are blocked from each other and the circuit remains pressurized for actuating pump means 17 of hydrostatic transmission 19. As suggested above, orifice 48 (FIG. 1) is suitably sized to primarily function to compensate for any leakage that may occur in valve 16 and will maintain the desired back pressure (e.g., 150 psi) in lines 44 and 45 for operational purposes.

In the "run" condition of operation, the aforedescribed pressure differential across venturi 25 will function to condition underspeed actuator 23 (FIG. 1) for operation of servo system 26 of pump means 17 in a conventional manner. As described in above-referenced U.S. Pat. No. 3,996,743, lines 32 and 33 will communicate a differential pressure across underspeed actuator 23 to automatically control the operation of servo system 26, via a standard linkage 24. Since such pressure differential is generally proportional to the operating speed of the engine and pump 11, increasing or decreasing the speed of the engine will result in a corresponding change in the pressure differential to closely control the operation of pump means 17 and, in particular, the displacement of pump P thereof.

As further described in U.S. Pat. No. 3,996,743, operator movement of speed control lever 14 to place directional control valve 16 in a selected "run" position will simultaneously reposition piston 23' of underspeed actuator 23, via standard linkage 22. Shifting of the piston to an extreme position will provide for relative maximum displacement of pump P, as well as maximum operating speed of motor M, and is commonly referred to as "zero underspeed". Movement of speed control lever 14 to its other extreme position in the "run" condition of operation will move piston 23' of underspeed actuator 23 to an opposite extreme position and condition the hydrostatic transmission for "full underspeed" operation.

It should be understood that the engine is mechanically connected to drive pump P and when the pump is driven at rated or optimum speed by the engine, fluid output from positive displacement pump 11 will be substantially constant. Fluid flow across throat 76 of venturi 25 (FIG. 2) will create the above-described pressure differential, as between lines 30 and 31, and when speed control lever 14 is set in its maximum speed position during the "run" condition of operation, underspeed actuator 23 will be shifted towards its "zero underspeed" position. However, as the vehicle and transmission 19 encounter an increased load or increased resistance to movement to cause "lugging" of the engine, operating speed of pump 11 will decrease with a resultant decrease of fluid flow through venturi throat 76.

A relative pressure increase in line 31 thus results. This increased relative pressure will function to actuate the underspeed valve in proportion to the amount of relative pressure increase within line 31. Accordingly, the displacement of pump P is decreased to thereby reduce the torque requirements for driving the pump by the engine until such torque requirements equal the torque output of the engine at an instantaneous reduced speed. Should the increased resistance remain constant for a period of time, underspeed actuator 23 will remain balanced intermediate the "zero underspeed" and "full underspeed" conditions of operation.

When the increased load is relieved, the engine is permitted to regain its rated operating speed with pump 11 also returning to its normal operating speed. At such time, normal fluid flow through venturi throat 76 reestablishes the original pressure differential in conduits 30 and 31 so that underspeed actuator 23 may be again shifted toward its "zero underspeed" position.

As discussed above, quick response valve 34 is suitably interconnected between venturi 25 and an upstream side of underspeed valve 23 in order to provide a slow recovery rate for the underspeed condition when the engine is coming up to its full operational speed, but to provide a quick down action of the underspeed to drop from a predetermined maximum speed to a lower or zero speed condition.

When the operator desires to override the operation of speed control lever 14, when it is in its "run" position of operation, he need only depress pedal 27 to rotate the spool 65 of override control valve 28 clockwise in FIGS. 5-7. Ax explained above, the override control valve will function to change the pressure differential as between lines 32 and 33 which normally controls the operation of servo system 26 of pump means 17. In particular, sufficient rotation of the spool past angle "a" (FIG. 6) to interconnect passages 66 and 67 via passage 71 will cause underspeed actuator 23 to "move down" to thus reduce the displacement of pump P the desired amount. As shown in FIG. 7, the change in the pressure differential can be closely controlled by metering slots 74.

Should the operator depress pedal 27 to its full override condition of operation, past angle "b" in FIG. 5 whereby passage 72 connects line 59 with drain line 73 and tank 13, chamber 57 (FIG. 2) will be exhausted to permit spool 51 of valve means 50 to move leftwardly to its inactivated or closed position. Simultaneously therewith, line 58 will exhaust to permit movement of spool 61 fully rightwardly (FIG. 2) to exhaust the actuating chamber of brakes 21 (FIG. 1), via line 44 and passages 62 and 63. Thus, the operator must return speed control lever 14 and directional control valves 16 to their reset positions before brakes 21 can be re-released and transmission 18 reactivated for driving the vehicle. Likewise, should the operator turn the engine off and again attempt to restart the engine with speed control lever 14 in a "run" position, he must also return to the above-described reset positions of the control lever and directional control valve 16 prior to activation of transmission 18.

As shown in FIGS. 5-7, the operator may effect the normal override function by rotating spool 66 through an angle of "b" minus "a". Should such an angle be exceeded, the operator must return speed control lever 14 to its reset position in the manner described above. However, so long as the operator remains within this range, he may release foot pedal 27 whereby the control circuit will return to normal operation, with control lever 14 having been retained in its original "run" position in notch 15 (FIG. 1).

Other aspects, objects and advantages of this invention can be obtained from a study of the drawings, the disclosure and the appended claims.

I claim:
1. A control circuit comprising
a source of pressurized fluid (10),
variable displacement pump means (17) for having the displacement thereof varied, said variable displacement pump means (17) including a servo system (26) adapted to vary the displacement of said pump means (17),
a replenishing valve (43) connected between said source (10) and said pump means (17) to make-up loss of fluid and to controllably interrupt fluid from said pump means (17),
pressure responsive control valve means (50,60) for controlling fluid pressure to and from said replenishing valve (43) when positioned in actuated and deactuated conditions of operation, respectively,
primary control means (14,16,23,25) for effecting the communication of pressurized fluid from said source (10) to said replenishing valve (43) and actuatable for effecting the selective venting of pressurized fluid from said replenishing valve (43) and for varying the displacement of said pump means (17) through said servo system (26) between minimum and maximum values, said primary control means incuding control valve means (16) for communicating fluid pressure to said pressure responsive control valve means (50,60) to effect movement thereof to its actuated condition of operation and means (25) for creating a differential fluid pressure signal to said servo system (26) for controlling the displacement of said pump means (17) in response to actuation of said primary control means (14,16,23,25), and
override control means (27,28), independent of the supply of said source fluid to said primary control means (14,16,23,25) said pressure responsive control valve means (50,60), and said replenishing valve (43), for (A) selectively varying said signal to said servo system (26) for varying the displacement of said pump means (17) when said primary control means (14,16,23,25) is in its actuated condition of operation, independently of actuation of the control valve means (16) of said primary control means (14,16,23,25), in response to an initial movement of said override control means (27,28), and (B) venting pressurized fluid from said pressure responsive control valve means (50,60) to effect movement thereof to its deactuated condition of operation wherein pressurized fluid is vented from said replenishing valve (43) by said pressure responsive control valve means (50,60) and further varying the displacement of said pump means (17) through said servo system (26) in response to further movement of said override control means (27,28).

2. The control circuit of claim 1 wherein said source of pressurized fluid (10) comprises an engine-driven pump (11) and wherein the means (25) for creating said signal of said primary control means (14,16,23,25) includes venturi means (25) for receiving pressurized fluid from said pump (11) and for creating a fluid pressure differential thereacross for controlling actuation of said variable displacement pump means (17) in response to the speed of said pump (11).

3. The control circuit of claim 2 wherein said primary control means (14,16,23,25) further comprises an operator control lever (14) connected to said control valve means (16) and an underspeed control means (23) connected to said control lever (14) for simultaneous actuation thereby along with said control valve means (16), said underspeed control means (23) further connected to said variable displacement pump means (17) and to said venturi means (25) for receiving said differential pressure from said venturi means (25) to control the displacement of said variable displacement pump means (17).

4. The control circuit of claim 1 wherein said variable displacement pump means (17) comprises a pump (P) of a hydrostatic transmission (18), said hydrostatic transmission further comprising a fluid motor (M) connected to said pump (P) to be driven thereby.

5. The control circuit of claim 1 wherein said source of pressurized fluid (10) comprises an engine-driven pump (11) and wherein said means (25) for creating a fluid pressure signal creates a signal at least generally proportional to the speed of said pump (11) for controlling the displacement of said variable displacement pump means (17) in response to said signal.

6. The control circuit of claim 5 wherein said override control means (27,28) comprises an override valve means (28) for selectively varying said signal to override said primary control means (14,16,23,25).

7. The control circuit of claim 6 wherein said override valve means (28) comprises a spool (65) rotatably mounted in a housing (52) for rotary movement between a normally closed position blocking communication of said signal therethrough and an open position for bypassing said signal therethrough to override said primary control means (14,16,23,25).

8. The control circuit of claim 7 wherein said spool (65) has a plurality of passages (69,70,71) formed therein for bypassing said signal therethrough when it is maintained in its open position.

9. The control circuit of claim 8 further comprising means (74) formed on said spool (65) for gradually metering said signal through the passages (69,70,71) thereof when said spool (65) is rotated from its closed to its open position.

10. The control circuit of claim 1 wherein said control valve means (16) is sequentially movable between vent, reset, and run positions, said pressure responsive control valve means defining reset valve means (50,60),
passage means (44,62,63) associated with said reset valves means (50,60) for venting pressurized fluid from said replenishing valve (43) when said control valve means (16) is in its vent position, and wherein said reset valve means (50,60) blocks the venting of pressurized fluid from said replenishing valve (43) when said control valve means (16) is moved to its reset position and prevents said primary control means (14,16,23,25) from varying displacement of said variable displacement pump means (17) through said servo system (26) unless said control valve means (16) is first moved to its reset position prior to movement thereof to its run position.

11. The control circuit of claim 10 wherein said reset valve means (50,60) comprises a first valve means (50) movable from a first position to a second position when pressurized fluid is communicated thereto when said control valve means (16) is maintained in its reset position for permitting pressurized fluid to be communicated to said replenishing valve (43).

12. The control circuit of claim 11 wherein said reset valve means (50,60) further comprises second valve means (60) movable between first and second positions and connected to said first valve means (50) for venting pressurized fluid from said replenishing valve (43) when said second valve means (60) is in its first position and for permitting pressurized fluid to be communicated to said replenishing valve (43) when said second valve means (60) is in its second position.

13. The control circuit of claim 12 wherein said second valve means (60) is connected to said first valve means (50) for movement to its second position in response to movement of said first valve means (50) to its second position.

14. The control circuit of claim 12 wherein said first valve means (50) is responsive to movement of said control valve means (16) to its reset position to move from its first position and progressively delay its further movement to its second position to permit pressurized fluid to be communicated to said second valve means (60) to move said second valve means (60) from its first position to its second position.

15. The control circuit of claim 10 further comprising brake means (21) connected to said primary control means (14,16,23,25) and normally held in an engaged condition of operation when said control valve means (16) is maintained in its vent position and for having pressurized fluid communicated thereto to release said brake means (21) when said control valve means (16) is moved to its reset position.

16. The control circuit of claim 5 wherein said brake means (21) is released when said control valve means (16) is maintained in its reset and run positions by moving said reset valve means (50,60) to a closed position to block the venting of pressurized fluid from said brake means (21).

* * * * *